United States Patent
Delahaye et al.

(10) Patent No.: US 9,297,086 B2
(45) Date of Patent: Mar. 29, 2016

(54) HYDROGEN-PRODUCING CELL COMPRISING A CELL OF A HIGH TEMPERATURE STEAM ELECTROLYZER

(75) Inventors: Thibaud Delahaye, Tresques (FR); Pierre Baurens, Roybon (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 143 days.

(21) Appl. No.: 13/995,305

(22) PCT Filed: Dec. 16, 2011

(86) PCT No.: PCT/EP2011/073130
§ 371 (c)(1),
(2), (4) Date: Jul. 2, 2013

(87) PCT Pub. No.: WO2012/084738
PCT Pub. Date: Jun. 28, 2012

(65) Prior Publication Data
US 2013/0284591 A1 Oct. 31, 2013

(30) Foreign Application Priority Data
Dec. 20, 2010 (FR) .................................... 10 60840

(51) Int. Cl.
*C25B 1/10* (2006.01)
*C25B 9/10* (2006.01)
*C25B 15/08* (2006.01)
*C25B 9/08* (2006.01)

(52) U.S. Cl.
CPC ... *C25B 9/10* (2013.01); *C25B 1/10* (2013.01); *C25B 9/08* (2013.01); *C25B 15/08* (2013.01); *Y02E 60/366* (2013.01)

(58) Field of Classification Search
None
See application file for complete search history.

(56) References Cited

U.S. PATENT DOCUMENTS

| | | | | |
|---|---|---|---|---|
| 3,401,099 A | * | 9/1968 | McEvoy | 205/338 |
| 4,087,976 A | * | 5/1978 | Morrow et al. | 60/643 |
| 4,620,914 A | * | 11/1986 | Abens et al. | 204/265 |
| 4,767,518 A | * | 8/1988 | Maskalick | 204/242 |

(Continued)

FOREIGN PATENT DOCUMENTS

FR 2916653 A1 12/2008

OTHER PUBLICATIONS

H. Matsumoto et al, Current efficiency of electrochemical hydrogen pumping using a high-temperature proton conductor SrCe0.95Yb0.05O3-a, Solid State Ionics, vol. 127, No. 3-4, Jan. 2000, pp. 345-349.*

(Continued)

*Primary Examiner* — Harry D Wilkins, III
(74) *Attorney, Agent, or Firm* — Hultquist, PLLC; Mary B. Grant

(57) ABSTRACT

A hydrogen-producing cell comprising a cell of a high temperature steam electrolyzer or HTSE comprising a porous cathode (404) and a porous anode (402) on either side of a dense and gases-impervious anion conducting electrolyte (403), wherein said cell of the high temperature steam electrolyzer is directly coupled, in series, with a cell of an electrochemical pump comprising a porous anode (406) and a porous cathode (408) on either side of a dense and gases-impervious proton conducting electrolyte (407), at the cathode (404) of the cell of the high temperature steam electrolyzer and at the anode (406) of the electrochemical pump.

17 Claims, 3 Drawing Sheets

(56) References Cited

U.S. PATENT DOCUMENTS

| | | | |
|---|---|---|---|
| 5,037,525 A | 8/1991 | Badwal | |
| 5,587,251 A * | 12/1996 | Spaeh et al. | 429/460 |
| 6,168,705 B1 * | 1/2001 | Molter | B01D 53/228 205/637 |
| 8,500,971 B2 | 8/2013 | Le Gallo et al. | |
| 2003/0062268 A1 * | 4/2003 | Kosek et al. | 205/637 |
| 2004/0040862 A1 * | 3/2004 | Kosek et al. | 205/637 |
| 2004/0112741 A1 * | 6/2004 | Murdoch | 204/265 |
| 2007/0235325 A1 | 10/2007 | Kamachi et al. | |
| 2010/0196767 A1 | 8/2010 | Sala et al. | |
| 2010/0200396 A1 * | 8/2010 | Le Gallo | 204/258 |
| 2010/0200422 A1 * | 8/2010 | Le Gallo et al. | 205/412 |
| 2011/0229786 A1 | 9/2011 | Di Iorio et al. | |
| 2011/0253548 A1 | 10/2011 | Di Iorio et al. | |
| 2012/0031772 A1 * | 2/2012 | Dean | C25B 1/10 205/637 |
| 2012/0186976 A1 | 7/2012 | Laucournet et al. | |
| 2013/0043123 A1 | 2/2013 | Reytier et al. | |
| 2013/0062215 A1 * | 3/2013 | Kurashina | C25B 15/02 205/335 |
| 2014/0017592 A1 * | 1/2014 | Delahaye et al. | 429/482 |

OTHER PUBLICATIONS

Kokkofitis, C., et al., "High temperature proton conductors: Applications in catalytic processes", "Solid State Ionics", 2007, pp. 507-513, vol. 178.

Ni, M., et al., "Technological development of hydrogen production by solid oxide electrolyzer cell (SOEC)", "International Journal of Hydrogen Energy", Apr. 9, 2008, pp. 2337-2354, vol. 33.

O'Brien, J., et al., "High-temperature electrolysis for large-scale hydrogen and syngas production from nuclear energy-summary of system simulation and economic analyses", "International Journal of Hydrogen Energy", Oct. 1, 2009, pp. 4808-4819, vol. 35.

Shin, Y., et al., "Evaluation of the high temperature electrolysis of steam to produce hydrogen", "International Journal of Hydrogen Energy", Nov. 28, 2006, pp. 1486-1491, vol. 32.

* cited by examiner

US 9,297,086 B2

HYDROGEN-PRODUCING CELL COMPRISING A CELL OF A HIGH TEMPERATURE STEAM ELECTROLYZER

CROSS-REFERENCE TO RELATED APPLICATIONS

This application is a U.S. national phase under the provisions of 35 U.S.C. §371 of International Patent Application No. PCT/EP11/73130 filed Dec. 16, 2011, which in turn claims priority of French Patent Application No. 1060840 filed Dec. 20, 2010. The disclosures of such international patent application and France priority patent application are hereby incorporated herein by reference in their respective entireties, for all purposes.

TECHNICAL FIELD

The invention relates to a hydrogen-producing cell comprising a cell of a high temperature steam electrolyzer or HTSE.

The technical field of the invention may be generally defined as that of devices for high temperature steam electrolysis or HTSE.

STATE OF THE PRIOR ART

In high temperature electrolyzers, electrolysis of water is carried out from vaporized water.

The function of a high temperature electrolyzer is to transform steam into hydrogen and oxygen according to the following reaction:

$$2H_2O_{(g)} \rightarrow 2H_2 + O_2.$$

This reaction is achieved via an electrochemical route in the cells of the electrolyzer.

Each elementary cell is, as shown in FIG. 1, made up with two electrodes, i.e. an anode (1) and a cathode (2), placed on either side of a solid electrolyte generally in the form of a membrane (3).

Both electrodes (1, 2) are electron conductors and the electrolyte (3) is an ion conductor.

The electrolyte may in particular be an anion conductor, more specifically an anion conductor of $O^{2-}$ ions, and the electrolyzer is then called an anionic electrolyzer.

The electrochemical reactions occur at the interface between each of the electron conductors and the ion conductor.

At the cathode (2), the half-reaction is the following:

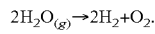
$$2H_2O + 4e^- \rightarrow 2H_2 + 2O^{2-};$$

And at the anode (1), the half-reaction is the following:

$$2O^{2-} \rightarrow O_2 + 4e^-.$$

The electrolyte (3), placed between both electrodes, is the migration location of the $O^{2-}$ ions (4), under the effect of the electric field generated by the potential difference imposed between the anode (1) and the cathode (2).

An elementary reactor, illustrated in FIG. 2, consists of an elementary cell (5) as described above, with an anode (1), an electrolyte (3) and a cathode (2) and of two mono-polar connectors or more exactly two half-interconnectors (6, 7) which ensure the electric, hydraulic and thermal functions. This elementary reactor is called a module.

In order to increase the produced hydrogen and oxygen throughputs, and as is this shown in FIG. 3, several elementary modules are stacked (8), the cells (5) then being separated by interconnectors or bipolar interconnection plates (9).

The whole of the modules (8) is positioned between two upper (10) and lower (11) interconnection plates which bear electric power supplies and gas supplies (12). This is then referred to as a «stack» (FIG. 3).

There exist two designs, configurations, architectures for the stacks:
- tubular stacks, in which the cells are tubes, and
- planar stacks, in which the cells are made in the form of plates as in FIG. 3.

Electrolysis of steam at a high temperature in an anionic electrolyzer encounters major problems which limit its yield.

Accordingly, industrial development of high temperature steam electrolyzers is also limited.

Indeed, in present anionic electrolyzers, the steam to be electrolyzed is directly injected into the cathodic compartment of the electrochemical cell, the location of the reduction of water into hydrogen.

Consequently, the product of the reaction i.e. the hydrogen formed is mixed with the initial reagent, i.e. the injected water, which then plays the role of a diluent gas, and limits the reaction kinetics of the hydrolysis.

One of the main problems which is therefore posed in anionic electrolyzers is that it is not possible to attain high yields during use, i.e. high electrolysis percentages of steam.

In order to find a remedy to this problem, it is possible to increase the surface of the cells [1].

The increase in the size of the electrolyzer has a direct impact on the cost of the latter.

Another problem which is posed with anionic electrolyzers is that, conversely, non-electrolyzed steam is found in the hydrogen produced at the outlet of the electrolyzer.

Separation devices then have to be set into place at the outlet of the electrolyzer in order to purify the hydrogen by extracting the water which is contained therein [1].

For example, the hydrogen may be treated by condensation of the steam and then by having it pass into a drying stage.

The implementation of such a separation, purification system has non-negligible additional size and cost.

A solution which was contemplated for finding a remedy to these problems is to vaporize in the cathodic compartment a larger amount of water than the amount of water required for the sought production of hydrogen.

However, this causes additional consumption of energy which will reduce the overall energy yield of the electrolysis unit [2, 3].

Finally, the cathodes of the electrolyzer are generally made of a cermet based on nickel metal, and it is therefore necessary, in order to avoid degradation of the cermet, to inject hydrogen into the steam introduced into the cathodic compartment.

Generally it is therefore necessary to sample the hydrogen at the outlet of the electrolyzer and then compress it before reinjecting it into the steam [1].

This last operation therefore requires the presence of a hydrogen network with controlled quality, coupled on the upstream steam circuit.

As a summary, the problems which are posed in these anionic electrolyzers are solved:
- by increasing the surface area of the cells for a given production throughput;
- by vaporizing an excess of water upstream from the electrolyzer; 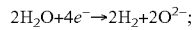
- by separating the steam from the hydrogen outside the electrolyzer, i.e. in a cold area; 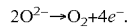

by sampling the hydrogen downstream from the electrolyzer, and then by compressing it in order to inject it into the steam circuit upstream from the electrolyzer.

However, as this was discussed above, none of these solutions perfectly meet the whole of the problems posed.

Indeed, all the solutions generate significant overcosts and/or new difficulties.

Therefore there exists a need which is still not met, for a high temperature steam electrolyzer or HTSE which gives the possibility of providing a satisfactory solution to all the problems posed by high temperature steam electrolyzers of the prior art as listed above.

More particularly, there exists a need for such a high temperature steam electrolyzer which while solving the whole of these problems does not cause new difficulties and/or new overcosts, unlike the solutions already proposed as discussed above.

The goal of the present invention is to provide a high temperature steam electrolyzer which i.a. meets these needs.

The goal of the invention is further to provide a high temperature steam electrolyzer which does not have the drawbacks, defects, limitations and disadvantages of the high temperature steam electrolyzers of the prior art, and which solves the whole of the problems posed by high temperature steam electrolyzers of the prior art.

SUMMARY OF THE INVENTION

This goal, and further other ones are achieved, according to the invention by a hydrogen-producing cell comprising a cell of a high temperature steam electrolyzer or HTSE comprising a porous cathode (404) and a porous anode (402) on either side of a dense and gases-impervious anion conducting electrolyte (403), in which said cell of the high temperature steam electrolyzer is directly coupled, in series, with a cell of an electrochemical pump comprising a porous anode (406) and a porous cathode (408) on either side of a dense and gases-impervious proton conducting electrolyte (407) at the cathode (404), of the cell of the high temperature steam electrolyzer and at the anode (406) of the electrochemical pump.

Generally, the cell further comprises supply means for supplying the cell with a pure water stream or a stream of a water and hydrogen mixture, and means for drawing off a pure oxygen stream and a pure hydrogen stream from the cell.

Let us specify that in the whole of the description, by dense electrolyte or more generally by dense layer or material, is generally meant an electrolyte or a layer or material for which the porosity is less than 7% by volume.

Advantageously, the cathode (404) of the cell of the steam electrolyzer and the anode (406) of the electrochemical pump are assembled via a porous thick layer with open porosity (405).

Advantageously, the porous thick layer (405) with open porosity has an open porosity from 20% to 90% by volume, preferably from 30% to 70% by volume.

Advantageously, the porous thick layer (405) with open porosity has a thickness from 0.05 mm to 5 mm, preferably from 0.5 mm to 5 mm.

Advantageously, the porous thick layer (405) with open porosity consists of the same material as the cathode (404) of the cell of the steam electrolyzer; or the porous thick layer (405) with open porosity consists of a material equivalent (i.e. with a close chemical composition for substantially similar electron conduction) to the material of the cathode (404) of the cell of the steam electrolyzer; or the porous thick layer (405) with open porosity consists of a material chemically compatible with the material of the cathode (404) of the cell of the steam electrolyzer; or the porous thick layer (405) with open porosity consists of the same electron conducting material as the cathode (404) of the cell of the steam electrolyzer.

Advantageously, the porous thick layer (405) with open porosity has greater porosity than the porosity of the cathode (404) of the cell of the steam electrolyzer.

Advantageously, the cathode (404) of the cell of the steam electrolyzer has an open porosity from 20% to 40% by volume.

Advantageously, the porous thick layer (405) with open porosity consists of a material different from the material of the anode (406) of the electrochemical pump.

Advantageously, the porous thick layer (405) with open porosity has a greater porosity than the porosity of the anode (406) of the electrochemical pump.

Advantageously, the anode (406) of the electrochemical pump has an open porosity from 20% to 40% by volume.

The cell according to the invention, in a first embodiment, may have a planar geometry.

Advantageously, such a cell with planar geometry may comprise the stack of the following successive layers:
bipolar plate or internal interconnector;
porous anode of the cell of the high temperature steam electrolyzer;
dense gases-impervious anion conducting electrolyte of the cell of the high temperature steam electrolyzer;
porous cathode of the high temperature steam electrolyzer;
porous thick layer with open porosity;
porous anode of the electrochemical pump;
dense gases-impervious proton conducting electrolyte of the electrochemical pump;
porous cathode of the electrochemical pump;
bipolar plate or external interconnector.

The cell according to the invention in a second embodiment, may have tubular geometry.

Advantageously, such a cell with tubular geometry may comprise a metal tube (401), and the following layers successively positioned around the external lateral surface of said metal tube (401), and forming concentric tubes:
porous anode (402) of the high temperature steam electrolyzer cell;
dense gases-impervious electrolyte (403) of the cell of the high temperature steam electrolyzer;
porous cathode (404) of the high temperature steam electrolyzer;
porous thick layer (405) with open porosity;
porous anode of the electrochemical pump (406);
dense gases-impervious electrolyte of the electrochemical pump (407);
porous cathode of the electrochemical pump (408, 409);
external metal tube (410).

Advantageously, in the cell with tubular geometry according to the invention, one of the longitudinal ends of the tubes is closed and the other of the longitudinal ends of the tubes is provided with sealing means.

The cell according to the invention couples in series a high temperature steam electrolyzer cell HTSE comprising an anion conducting electrolyte (or Solid Oxide Electrolysis Cell, SOEC) and an electrochemical pump consisting of a cell comprising a proton conducting electrolyte.

In other words, the cell according to the invention couples a cell with an anion conducting material and a cell with a proton conducting material.

Such a series coupling, such a junction, connection between a cell with an anion conducting material and a cell with a proton conducting material, has never been described nor suggested in the prior art.

The coupling, the junction, the connection between the high temperature steam electrolyzer HTSE cell and the electrochemical pump is ensured at the cathode of the cell of the high temperature steam electrolyzer HTSE, i.e. the cathode of the anion conducting cell, and at the anode of the electrochemical pump, i.e. the anode of the proton conducting cell.

This serial mounting gives the possibility of using a common power supply for both cells and therefore ensures consequent energy saving.

In the cell according to the invention, the hydrogen formed in the cell of the high temperature steam electrolyzer HTSE is electrochemically pumped as it is produced.

More specifically, the hydrogen produced at the HTSE cathode is oxidized, at the anode of the electrochemical pump, into protons which will diffuse, migrate, while passing through the proton membrane as far as the cathode of the electrochemical pump where they will be reduced into pure hydrogen free of water. Thus, in the cell according to the invention, it is possible to shift the reaction equilibrium towards the formation of hydrogen.

The hydrogen-producing cell according to the invention synergistically associates in series two cells of a different type which it integrates into a single and same compact, one-block (monoblock) apparatus, which causes significant gains in terms of size and therefore of cost of the apparatus.

The cell according to the invention does not have the drawbacks, defects, limitations and disadvantages of the cells of the prior art and provides a solution to the problems posed by the cells of the prior art.

It may notably be considered that the cell according to the invention, in which the hydrogen formed is electrochemically pumped as it is produced, provides an integrated and economically advantageous solution to the problems which were posed in the cells of the prior art.

The notion of electrochemical pump has already been mentioned by various teams of researchers who work in the field of catalyzes.

A summary of these studies is shown in document [4].

In the devices shown in this document, the proton conducting electrochemical pump is directly associated with a catalytic chamber and benefits from a separate electric power supply.

The catalytic chamber, consisting of a porous catalysis support and of a catalyst dispersed at its surface then appears as an extension of the anode of the electrochemical pump and only two reaction compartments are defined around the membrane, i.e. a cathodic compartment and an anodic compartment.

In such systems, by controlling the applied current, it is possible to shift the equilibrium of the reaction which occurs at the catalytic bed and to increase the yield.

These systems are very different from the cell according to the invention.

Indeed, the latter electrically and physically couples two electrochemical systems, i.e. an anionic system and a protonic system, in series.

Consequently, in the cell according to the invention, four distinct reaction areas are defined in three compartments, which in fine allows dissociation of the injected water into pure hydrogen and oxygen and free of water.

Indeed, the water is dissociated into hydrogen and $O^{2-}$ ions at the cathode of the electrolyzer. The latter diffuse through the electrolyte/anion conducting dense membrane of the electrolyzer towards the anode where they are oxidized in the form of oxygen. The released hydrogen, as for it, is oxidized at the anode of the electrochemical pump in the form of protons which diffuse through the electrolyte/proton conducting dense membrane of the electrochemical pump towards the cathode of the pump where they are reduced into pure hydrogen.

Here, one of the advantages of the cell of the invention is of producing oxygen and hydrogen with great purity which therefore does not require any separation, purification treatment at the end of their production. Indeed, the cell according to the invention achieves this separation, purification in an integrated $H_2/H_2O$ separation stage which is none other than the electrochemical pump.

The cell according to the invention unlike the devices of the prior art therefore does not have to be associated with bulky and costly separation, purification installations, since the separation, purification means are an integral part of the cell.

Therefore the result is substantial savings in terms of space and costs.

DETAILED DESCRIPTION OF SPECIFIC EMBODIMENTS

The device according to the invention comprises the physical association of two electrochemical cells, i.e. a high temperature steam electrolyzer «HTSE» cell on the one hand and an electrochemical pump cell on the other hand.

These cells both have the same configuration or geometry for allowing their coupling, assembling.

Thus, the cells may both have a 2D (two-dimensional) configuration or geometry or the cells may both have a 3D (three-dimensional) configuration or geometry.

The 2D configuration is a planar configuration.

The device according to the invention is described in the following in a 3D configuration and in a tubular version, first of all for the sake of simplification, and then because this is the geometry which gives the possibility of making the most out of all the advantages of the invention.

The man skilled in the art will have no difficulty, on the basis of the description of the 3D configuration in the tubular version, in designing other configurations and versions of the device according to the invention.

Moreover, the planar configuration is an extension of the cylindrical configuration to an infinite radius and to an infinity of nested cylindrical cells, with additionally a supply manifold and two discharge manifolds.

As the seals are in electro-active therefore hot areas on the other hand, the technologies will be identical with those conventionally used with SOFCs with glass gaskets or gold gaskets.

The device according to the invention in this 3D tubular configuration consists of different tubes, closed at one of their ends and encased in each other.

The ceramic tubes may be made by different techniques for applying either technical ceramics or not, such as isostatic pressing, dip coating, extrusion, injection, rapid prototyping, calibration, shell casting (hollow casting); etc.

Figure 1:
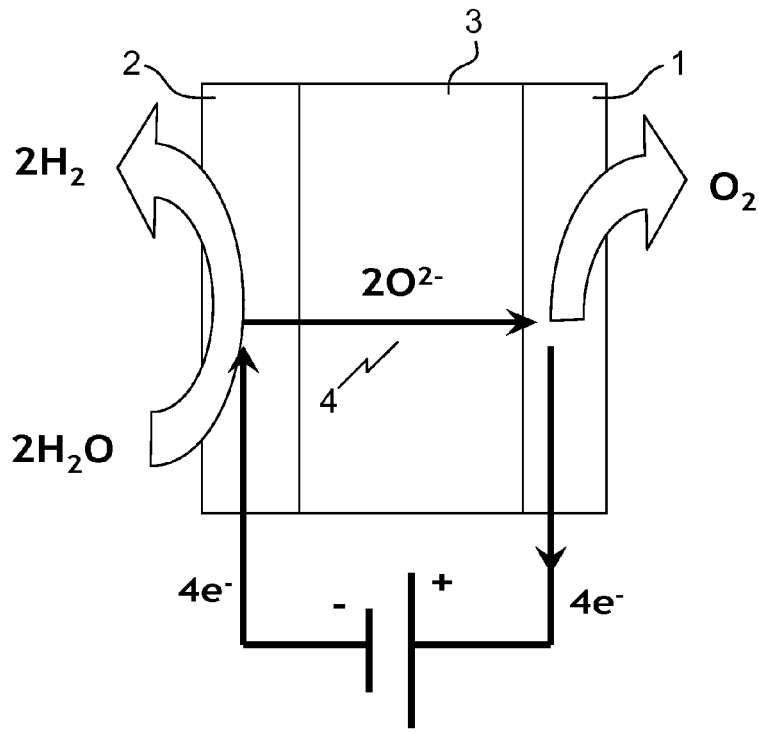
FIG. 1 is a schematic vertical cross-sectional view of an elementary cell of a high temperature steam electrolyzer (HTSE)
Figure 2:
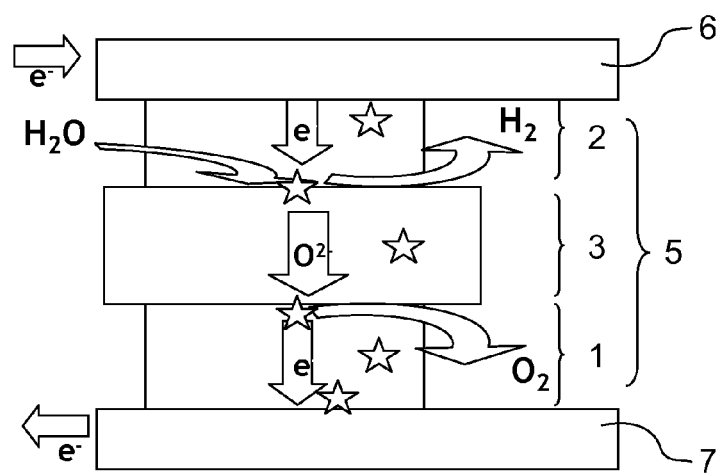
FIG. 2 is a schematic vertical cross-sectional view of an elementary reactor or elementary module of a high temperature steam electrolyzer (HTSE)
Figure 3:
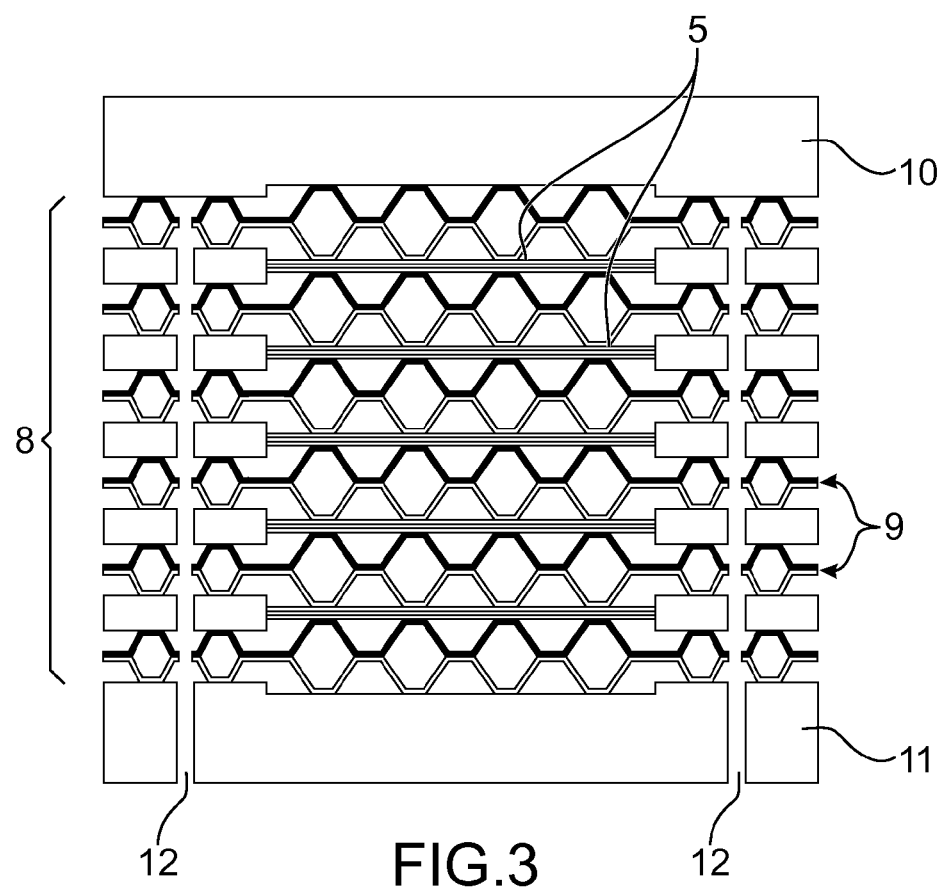
FIG. 3 is a schematic vertical cross-sectional view of a conventional high temperature steam electrolyzer comprising a stack of elementary modules.
Figure 4:
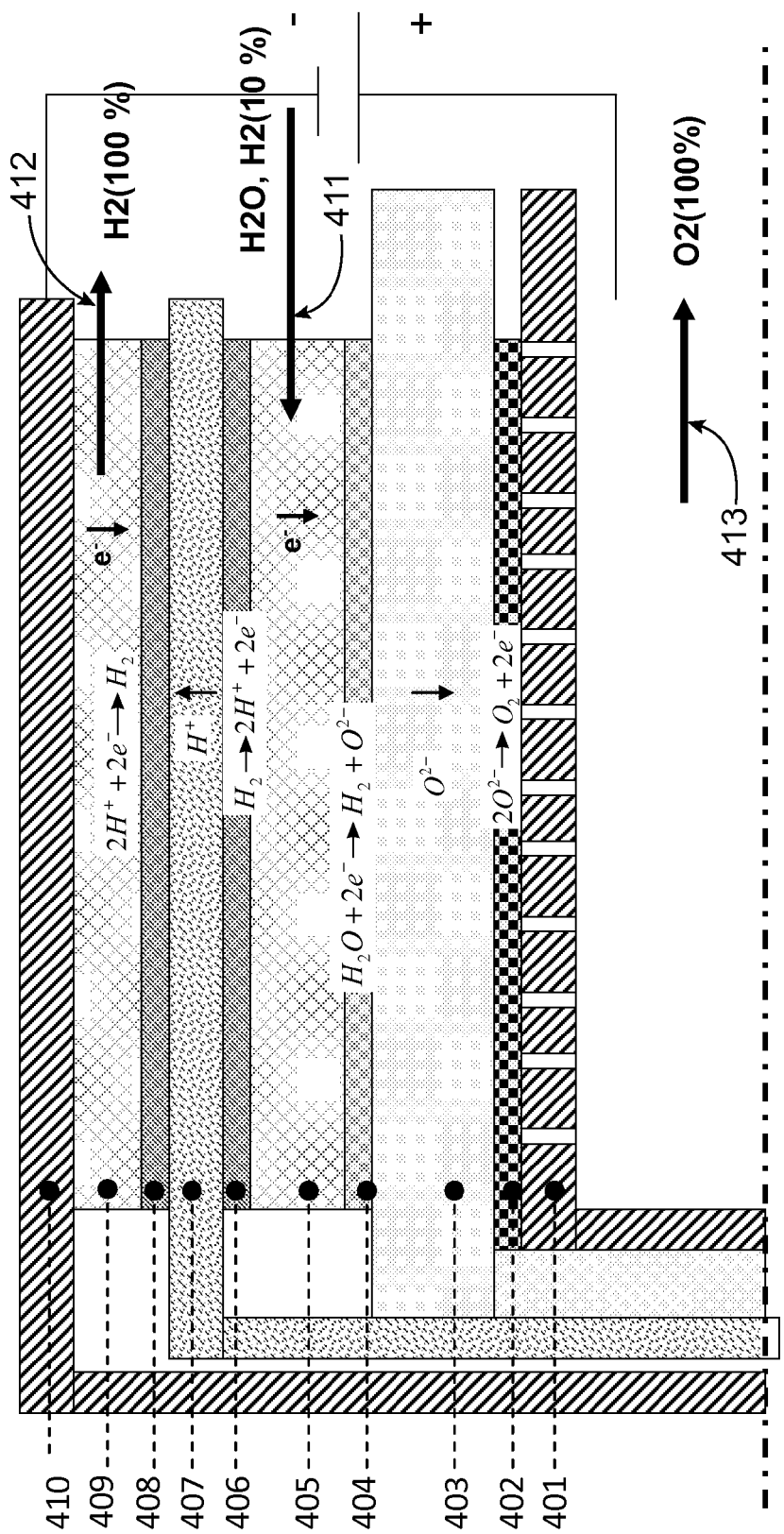
FIG. 4 is a schematic transverse half-sectional view of the hydrogen-producing cell according to the invention.

The device according to the invention described in FIG. 4, first comprises a metal tube (401), the side wall of which is openworked over the useful height, i.e. the height of the electrode of the electrolyzes reactor. In FIG. 4, it should therefore be noted that the horizontal direction is the direction of the height of the electrode.

This openworked metal tube (401) allows the arrival of an electric current at the anode of the high temperature steam electrolyzer (402). In other words, this openworked metal tube (401) forms the supply of anodic current.

This openworked metal tube (401) is closed at one of its ends, i.e. the end which is located in the electrolysis area, and it extends on the side of the other of its ends, as far as the outside of the electrolysis oven, in a cold area. This tube may thus freely expand in length.

The metal tube (401) is encased in a tube made of a dense ceramic (403), i.e. with a density generally greater than or equal to 93% of the theoretical density or further with a porosity of less than 7%.

This ceramic is an anion conducting gases—impervious ceramic (403), and constitutes the electrolyte of the high temperature steam electrolyzer.

The anion conducting gases-impervious dense ceramic (403) is generally made of an electrolyte of the 8YSZ type (yttriated zirconia), 3YSZ type (yttriated zirconia), ScZ type (scandiated zirconia), ScCeZ type (scandiated and ceriated zirconia), YbZ type (ytterbiated zirconia) or ScAlZ type (scandiated and aluminated zirconia).

The tube (403) is provided on its internal side wall with a porous anode, which has open porosity allowing free passage of the gases (402).

The porous anode (402) is for example based on LSM (lanthanum manganite substituted with strontium), LSCM (lanthanum chromo-manganite substituted with strontium), LSCF (lanthanum cobalto-ferrite substituted with strontium), PSCF (praseodymium cobalto-ferrite substituted with strontium), $Nd_2NiO_4$ (neodymium nickelate), $Pr_2NiO_4$ (praseodymium nickelate), $La_2NiO_4$ (lanthanum nickelate).

The external side wall of the tube (403) bears a porous cathode which has open porosity allowing free passage of the gases (404).

The cathode (404) is for example made of a material of the cermet type.

This cermet generally consists of an anion conducting ceramic such as 8YSZ, 3YSZ, ScZ, ScCeZ, YbZ, ScAlZ, GDC (ceria doped with gadolinium oxide $Gd_2O_3$), YDC (ceria doped with yttrium oxide $Y_2O_3$); nickel; and optionally copper.

The cermet may optionally comprise one or several other metals playing the role of a catalyst, for example selected from Ir, Ru, and Pt.

The cathode (404) includes, on its outer side, a porous collecting area (405).

This porous collecting area (405) may consist of the metal of the cermet, or of an electron conducting metal compatible with the conditions and the media in contact.

This porous collecting area (405) is a collecting area which may be described as thick, for example with a thickness of 0.05 mm to 5 mm, preferably from 0.5 mm to 5 mm.

The porous collecting area (405) further generally exhibits a greater open porosity than that of the cathode (404), which allows the porous conducting layer to be used as a gas supply.

The porosity of the porous collecting area (405) is generally comprised between 20% and 90% by volume, preferably between 30% and 70% by volume.

The external surface of the porous collecting area (405) bears another porous functional area (406) which exhibits an open porosity generally from 20 to 40% by volume, allowing free passage of the gases.

This other porous functional area (406) is for example made of a material of a cermet type consisting of a proton conducting ceramic such as BZY91, BCZY (Ba(Ce,Zr,Y)$O_{3-\delta}$), BCY, $BaIn_{1-x}Ti_{1-x}O_3$, $SrZr_xEr_{1-x}O_3$; and of nickel.

This other porous conducting area (406) plays the role of an anode for the electrochemical pump.

It may be considered that the layer (405) is common to the electrolysis cell and to the electrochemical pump, ensures continuity between both anionic and protonic cells and facilitates the physical assembling of both of these cells.

In fact, the layer (405) may consist of a specific element, or else this layer may be integrated to the electrolysis cell or to the electrochemical pump.

In other words, it may be stated that the electrochemical system according to the invention, the cell according to the invention, comprises the placing in series of two electrochemical reactors having in common a portion of the HTSE cathode and a portion of the anode of the electrochemical pump, i.e. the collecting portion of the intermediate cermet.

This common portion is none other than the layer (405) illustrated in FIG. 4.

The other porous functional area (406) is bound via its external surface, to a dense, gases-impervious, and proton conducting electrolyte (407).

This electrolyte (407) is for example an electrolyte of the BZY91, $BaIn_xTi_{1-x}O_3$, BCZY, BCY, $SrZr_xEr_{1-x}O_3$ type.

The electrolyte (407) just like the porous functional area (406) is cylindrical and bears on its external side surface an electrode (408), which is for example made of a material of the cermet type consisting of a proton conducting ceramic such as BZY91, $BaIn_xTi_{1-x}O_3$, BCZY, BCY, $SrZr_xEr_{1-x}O_3$; and of nickel.

This electrode (408) plays the role of a cathode and also itself includes a porous thick collecting area (409) exhibiting open porosity which allows free passage of the gases and, more specifically, of the gas formed in the device, i.e. hydrogen ($H_2$).

A last metal tube (410) rests on the external surface of the porous thick collecting area (409) made of cermet and will close the electrochemical system.

This metal tube (410) gives the possibility of supplying an electric current to the cathode of the electrochemical pump.

In the 3D tubular configuration, the sealing of the device is made outside the hot areas, at the free ends of the tubes, located on the right in FIG. 4.

Consequently, the sealing may easily be made with conventional so-called «cold» technologies at the free ends of the tubes.

The free ends may actually be colder than the other ends, since they are not equipped with electrodes and they are therefore not electrochemically activated.

Depending on the temperature level, conventional gasket technologies, applied at a temperature generally less than 300° C., or technologies with ceramic fibers, may be applied.

Moreover, the produced hydrogen is automatically transferred in principle into the hydrogen compartment, and the free ends of the tubes are located in «out-of-production» areas.

Consequently, the gas in these areas will be steam on the hydrogen side and oxygen on the oxygen side. Accordingly, a slight leak of steam in the oxygen will not be a risk, or an oxygen or hydrogen loss detrimental to the production yield. This is an additional advantage of the cell according to the invention of being able to ensure the sealing in a simple and reliable way by so-called «cold» techniques.

The reference, standard, anionic reactor or steam electrolyzer is: LS//YSZ//Ni—YSZ.

The reference protonic reactor is: Ni—BZY91//BZY91//Ni—BZY91.

The cell according to the invention generally operates under high pressure, for example a pressure above 10 bars and under an intermediate temperature, for example from 300° C. to 700° C.

The cell is fed with a mixture of water and hydrogen which generally comprises 0% (which means that the cell may be supplied with pure water) to 50% by volume of hydrogen, for example 10% by volume of hydrogen, at the layer (405) (arrow 411 in FIG. 4).

At the outlet, 100% pure hydrogen is collected through the free end of the tube (409) on the right in FIG. 4 (arrow 412) and 100% pure oxygen is collected through the free end of the tube (401) on the right in FIG. 4 (arrow 413).

In the following, the preparation, the manufacturing of a cell according to the invention are first of all described in a tubular, 3D geometry configuration.

In order to produce this system, consisting of two electrochemical cells in a tubular configuration, it is first of all possible to prepare the electrolyte (407) of the electrochemical pump by isostatic pressing.

This electrolyte is then sintered at a high temperature, for example for 3 hours at 1,650-1,700° C. in the case of BZY91.

A composite material intended to form after reduction, the anode and the cathode of the electrochemical pump is then deposited on either side of this electrolyte/proton conducting membrane (407).

Generally, the same composite material, for example NiO/BZY91, is deposited on either side of the electrolyte.

These depositions may be made simultaneously, for example by dip coating.

In the same way, a material for example a composite material intended to form, after subsequent reduction, the layers (409) and (405) responsible for ensuring the transfer of the charges and free passage of the gases is respectively deposited on the composite which by reduction will give the cathode (408) and on the composite which by reduction will give the anode (406).

This material may for example be NiO or else a NiO and ceramic composite material.

It is even advantageous, from the point of view of electric «collection» that the layer (409) or (405) be made of Ni and not of a cermet.

When the layer (409) or (405) is made of a ceramic-nickel cermet, the latter generally contains the ceramic in a small proportion, for example from 1% to 10% by mass and the ceramic is then mainly used as an anchoring for the nickel-metal, thus limiting its coalescence with temperature.

These deposits may be achieved simultaneously, for example by dip coating.

In a separate and size-adjusted way (diameter/length) in order to be incorporated into the electrochemical pump, the anion conducting electrolyte for example made of 8YSZ of the cell of the high temperature steam electrolyzer HTSE (403), is made by isostatic pressing.

This electrolyte is then sintered at a high temperature, for example for 3 hours at 1,550° C. in the case of YSZ.

Next on the external surface of the anion conducting electrolyte (403), a composite material is deposited, intended to form by reduction the cathode of the cell of the high temperature steam electrolyzer (HTSE) (404).

This composite material is for example NiO/8YSZ.

The deposition of this composite material may be achieved for example by dip coating.

The composite material by a reduction treatment will give the material making up the HTSE cathode.

Thus, for example, the NiO/8YSZ composite gives the Ni/8YSZ cermet.

Once the deposition of the HTSE cathode (404) is carried out, the tube consisting of the HTSE electrolyte (403) provided on its external surface with the HTSE cathode (404) is encased in the tube consisting of the proton conducting electrolyte of the electrochemical pump (407) and of the layers (405), (406), (408), and (409).

The whole is then co-sintered, for example for 3 hours at a temperature comprised between 1,200° C. and 1,400° C.

On the internal surface of the sintered anion conducting electrolyte, a material such as LSM is then deposited, intended to constitute the anode (402) of the high temperature steam electrolyzer cell.

This material may be deposited for example by dip coating or spray coating.

The deposited layer is then sintered, for example for 3 hours at 1,050° C. in the case of LSM.

Next, a single simultaneous and controlled reduction treatment under hydrogen or diluted hydrogen (from 2% to 5% for example) should be carried out. This heat reduction treatment generally comprises a plateau observed at a temperature from 400° C. to 1,000° C. for a period from 30 minutes to 10 hours.

Thus, for example it is possible to observe a plateau adapted to the reduction of the totality of NiO and located between 600 and 1,000° C.

This reduction leads to the formation of the materials constituting the cathode (408) and the anode (406) of the electrochemical pump, and of the materials constituting the layers (409) and (405).

This reduction also gives the possibility of obtaining the material constituting the HTSE cathode (404) of the cell of the high temperature steam electrolyzer.

Thus, the reduction of the composite material NiO/BZY91 gives the Ni/BZY91 cermet and reduction of the NiO gives metal nickel, while the reduction of the composite material NiO and ceramic gives the Ni/ceramic cermet, and the reduction of the composite material NiO/8YSZ gives the Ni/8YSZ cermet.

Examples of ceramics which enter the composition of the layers (409) and (405) have already been provided above.

The reduction is controlled in the sense that it is ensured that the reduction does not affect the layers which should not be reduced.

Thus, the anode (402) of the high temperature steam electrolyzes cell should not be reduced if it is made of LSM, while if it is made of $Nd_2NiO_4$, its reduction has no consequence.

It is actually possible to avoid that certain layers be reduced since they are located in different compartments, which may therefore be insulated from each other.

Finally, the internal (401) and external (410) tubular metal cases of the cell are added onto the internal surface of the layer (402) and onto the external surface of the layer (409), respectively.

The preparation, the manufacturing of a cell according to the invention is now described in a 2D, planar configuration, geometry.

In order to produce this system, consisting of two electrochemical cells in a planar configuration, it is first of all possible to prepare the electrolyte (407) of the electrochemical pump by tape casting.

This electrolyte is then sintered at a high temperature, for example for 3 hours at 1,650° C.-1,700° C. in the case of BZY91.

Next, a composite material intended to form by subsequent reduction the anode (406) and the cathode (408) of the electrochemical pump is deposited on either side of this electrolyte/proton conducting membrane (407).

Generally the same composite material, for example NiO/BZY91, is deposited on either side of the electrolyte (407).

These depositions may be achieved simultaneously, for example by dip coating or one after the other by screen printing or spray coating.

In the same way, a material, for example a composite material intended to form after subsequent reduction the layers (409) and (405) responsible for ensuring transfer of the charges and free passage of the gases, is deposited onto the composite which by reduction will give the cathode (408) and onto the composite which by reduction will give the anode (406), respectively This material may for example be NiO, or else a NiO and ceramic composite material.

It is even advantageous from the point of view of electric collection that the layer (409) or (405) be made of Ni and not made of a cermet.

When the layer (409) or (405) is made of a ceramic-nickel cermet, the latter generally contains the ceramic in a small proportion, for example from 20% to 50%, and the ceramic is then mainly used as an anchoring for nickel metal, thereby limiting its coalescence with temperature.

These depositions may be achieved simultaneously, for example by dip coating.

Next, a composite material intended to form by reduction the cathode of the cell of the high temperature steam electrolyzer HTSE (404), is deposited on the layer (405).

This composite material is for example NiO/8YSZ.

The deposition of this composite material may for example be achieved by screen printing or spray coating.

The anion-conducting electrolyte, for example 8YSZ, of the cell of the high temperature steam electrolyzer HTSE (403) is deposited on the layer (404) as a thin layer, for example with a thickness from 5 to 20 μm, for example also by screen printing.

The whole is then co-sintered, for example for three hours at a temperature comprised between 1,200° C. and 1,450° C.

A material such as LSM intended to form the anode (402) of the high temperature steam electrolyzer cell is deposited on the lower surface of the sintered anion conducting electrolyte (403).

This material may for example be deposited by screen printing or spray coating.

The deposited layer is then sintered, for example for 3 hours at 1,050° C. in the case of LSM.

Next, a single simultaneous and controlled reduction treatment under hydrogen or diluted hydrogen, for example from 2% to 5% should be carried out.

This reduction heat treatment generally comprises a plateau observed at a temperature from 400° C. to a 1,000° C. for a duration from 30 minutes to 10 hours.

Thus, it is for example possible to observe a plateau adapted to the reduction of the totality of NiO and located between 600° C. and 1,000° C.

This reduction leads to the formation of the materials constituting the cathode (408) and the anode (406) of the electrochemical pump, and of the materials constituting the layers (409) and (405).

This reduction also gives the possibility of obtaining the material constituting the HTSE cathode (404) of the cell of the high temperature steam electrolyzer.

Thus, the reduction of the composite material NiO/BZY91 gives the cermet Ni/BZY91 and the reduction of NiO gives nickel metal, while the reduction of the composite material NiO and ceramic gives the Ni/ceramic cermet, and the reduction of the composite material NiO/8YSZ gives the Ni/8YSZ cermet.

Examples of ceramics which enter the composition of the layers (409) and (405) have already been provided above.

The reduction is controlled in the sense that it is ensured that the reduction does not affect the layers which should not be reduced.

Thus, the anode (402) of the high temperature steam electrolysis cell should not be reduced if it made of LSM, while if it is made of $Nd_2NiO_4$, its reduction has no consequence.

As already indicated above, in order to avoid that certain layers be reduced, it is possible to insulate the compartments in which they are found by means of glass gaskets for example. Such a way of proceeding is well known to the man skilled in the art.

Finally, the internal (401) and external (410) bipolar plates or metal interconnectors of the cell are added onto the internal surface of the layer (402) and onto the external surface of the layer (409), respectively.

REFERENCES

[1] J. E. O'Brien et al., Int. J. of Hydrogen energy; 35 (2010), 4808-4819.
[2] Y. SHIN et al., Int. J. of Hydrogen energy; 32 (2007), 1486-1491.
[3] Meng Ni, Int. J. of Hydrogen energy; 33 (2008), 2337-2354.
[4] C. Kokkofitis, et al., Solid State Ionics; 178 (2007), 507-513.

The invention claimed is:

1. A hydrogen producing cell comprising a cell of a high temperature steam electrolyzer or HTSE comprising a porous cathode and a porous anode on either side of a dense and gases impervious anion conducting electrolyte wherein said cell of the high temperature steam electrolyzer is directly coupled, in series, with a cell of an electrochemical pump comprising a porous anode and a porous cathode on either side of a dense and gases impervious proton conducting electrolyte, at the cathode of the cell of the high temperature steam electrolyzer and at the anode of the electrochemical pump.

2. The cell according to claim 1, wherein the cathode of the cell of the steam electrolyzer and the anode of the electrochemical pump are assembled via a porous thick layer with open porosity.

3. The cell according to claim 2, wherein the porous thick layer with open porosity has an open porosity from 20% to 90% by volume.

4. The cell according to claim 2, wherein the porous thick layer with open porosity has a thickness from 0.05 mm to 5 mm.

5. The cell according to claim 2, wherein the porous thick layer with open porosity consists of the same material as the cathode of the cell of the steam electrolyzer; or the porous thick layer with open porosity consists of a material equivalent to the material of the cathode of the cell of the steam electrolyzer; or the porous thick layer with open porosity consists of a material chemically compatible with the material of the cathode of the cell of the steam electrolyzer; or the porous thick layer with open porosity consists of the same electron conducting material as the cathode of the cell of the steam electrolyzer.

6. The cell according to claim 2, wherein the porous thick layer with open porosity has a porosity greater than the porosity of the cathode of the cell of the steam electrolyzer.

7. The cell according to claim 2, wherein the porous thick layer with open porosity consists of a material different from the material of the anode of the electrochemical pump.

8. The cell according to claim 2, wherein the porous thick layer with open porosity has a porosity greater than the porosity of the anode of the electrochemical pump.

9. The cell according to claim 2, which has a planar geometry.

10. The cell according to claim 9, which comprises the following stack of successive layers:
    bipolar plate or internal interconnector;
    porous anode of the cell of the high temperature steam electrolyzer;
    dense, gases impervious anion conducting electrolyte of the cell of the high temperature steam electrolyzer;
    porous cathode of the high temperature steam electrolyzer;
    porous thick layer with open porosity;
    porous anode of the electrochemical pump;
    dense, gases impervious proton conducting electrolyte of the electrochemical pump;
    porous cathode of the electrochemical pump;
    bipolar plate or external interconnector.

11. The cell according to claim 2, which has a tubular geometry.

12. The cell according to claim 11, comprising a metal tube, and the following layers successively positioned around the external lateral surface of said metal tube, and forming concentric tubes:
    porous anode of the cell of the high temperature steam electrolyzer;
    dense, gases impervious electrolyte of the cell of the high temperature steam electrolyzer;
    porous cathode of the high temperature steam electrolyzer;
    porous thick layer with open porosity;
    porous anode of the electrochemical pump;
    dense, gases impervious electrolyte of the electrochemical pump;
    porous cathode of the electrochemical pump;
    external metal tube.

13. The cell according to claim 12, wherein one of the longitudinal ends of the tubes is closed and the other of the longitudinal ends of the tubes is provided with sealing means.

14. The cell according to claim 2, wherein the porous thick layer with open porosity has an open porosity from 30% to 70% by volume.

15. The cell according to claim 2, wherein the porous thick layer with open porosity has a thickness from 0.5 mm to 5 mm.

16. The cell according to claim 1, wherein the cathode of the cell of the steam electrolyzer has an open porosity from 20% to 40% by volume.

17. The cell according to claim 1, wherein the anode of the electrochemical pump has an open porosity from 20% to 40% by volume.

* * * * *

UNITED STATES PATENT AND TRADEMARK OFFICE
CERTIFICATE OF CORRECTION

PATENT NO. : 9,297,086 B2
APPLICATION NO. : 13/995305
DATED : March 29, 2016
INVENTOR(S) : Thibaud Delahaye It is certified that error appears in the above-identified patent and that said Letters Patent is hereby corrected as shown below:

Specification

Column 8, lines 7-8: "BZY91, BCZY (Ba(Ce,Zr,Y)$O_{3-\delta}$, BCY, $BaIn_{1-x}Ti_{1-x}O_3$, $SrZr_xEr_{1-x}O_3$;"
should be -- BZY91, BCZY (Ba(Ce,Zr,Y)$O_{3-\delta}$, BCY, $BaIn_xTi_{1-x}O_3$, $SrZr_xEr_{1-x}O_3$; --.

Column 9, line 4: "LS//YSZ//Ni-YSZ" should be -- LSM//YSZ//Ni-YSZ --.

Signed and Sealed this
Seventh Day of June, 2016

Michelle K. Lee
*Director of the United States Patent and Trademark Office*